United States Patent [19]

Gilbert et al.

[11] 3,925,750
[45] Dec. 9, 1975

[54] AIR TRAFFIC CONTROL SYSTEM
[75] Inventors: Glen A. Gilbert, Hialeah, Fla.;
 James Hobbs, Overland Park, Kans.
[73] Assignee: Butler National Corporation,
 Minneapolis, Minn.
[22] Filed: Nov. 19, 1971
[21] Appl. No.: 200,633

Related U.S. Application Data
[62] Division of Ser. No. 776,209, Nov. 15, 1968, Pat. No. 3,623,090.

[52] U.S. Cl. ............................................ 340/27 NA
[51] Int. Cl.² ......................................... G01C 23/00
[58] Field of Search ......... 340/27 R, 27 NA, 324 A; 343/112 CA, 112 TC, 107, 5 ST, 5 EM

[56] References Cited
UNITED STATES PATENTS

| | | | |
|---|---|---|---|
| 3,130,401 | 4/1964 | Murphy | 343/112 TC |
| 3,387,302 | 6/1968 | Bevan | 340/27 NA |
| 3,414,901 | 12/1968 | Perkins et al. | 343/107 |
| 3,577,120 | 5/1971 | Sherbert | 340/27 NA |

*Primary Examiner*—Kathleen H. Claffy
*Attorney, Agent, or Firm*—Hill, Gross, Simpson, Van Santen, Steadman, Chiara & Simpson

[57] ABSTRACT

An aircraft traffic control system which has a first portion that allows aircraft to detect other aircraft in their vicinity so that they are aware of them and which also allows an aircraft to maintain a particular spacing with respect to a selected aircraft to alleviate the load on the ground air traffic controllers, is disclosed.

The identification, altitude and coordinates of an aircraft is transmitted and received by other aircraft and/or by ground stations to allow other aircraft to be aware of the position of traffic, and the ground stations may utilize the information for local and enroute control so that monitoring and control of all aircraft may be maintained throughout the system. Various instrumentations and implementations are disclosed which allow existing facilities to be used with modifications which are simple and relatively inexpensive.

1 Claim, 15 Drawing Figures

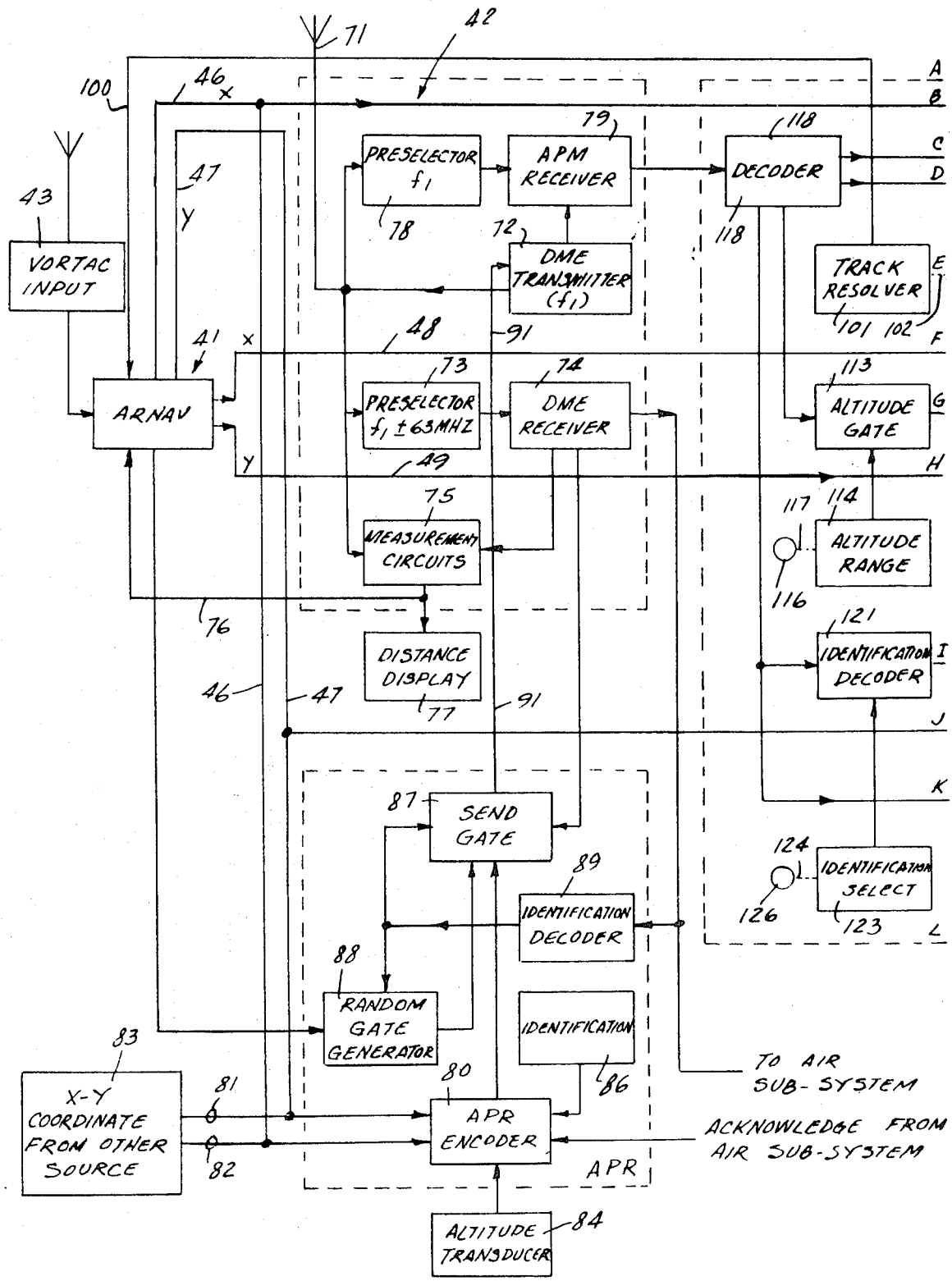

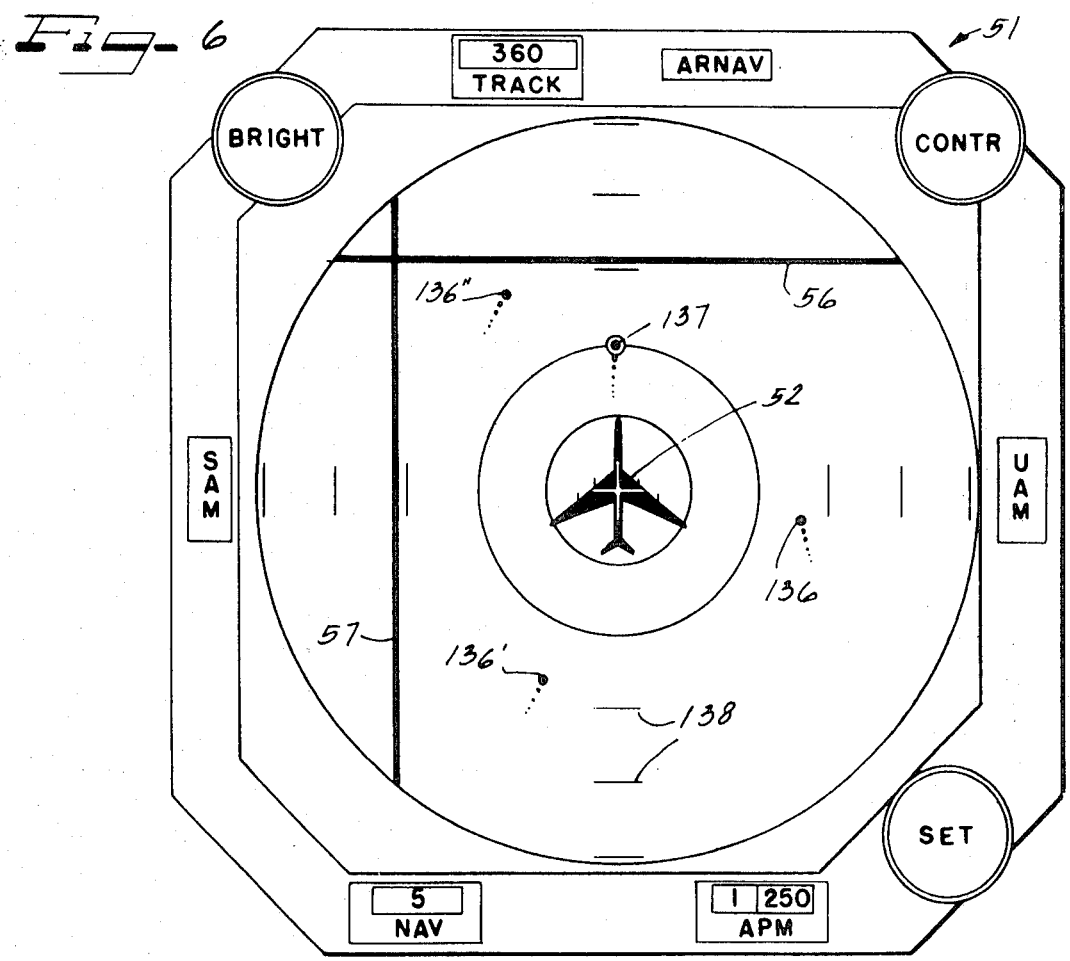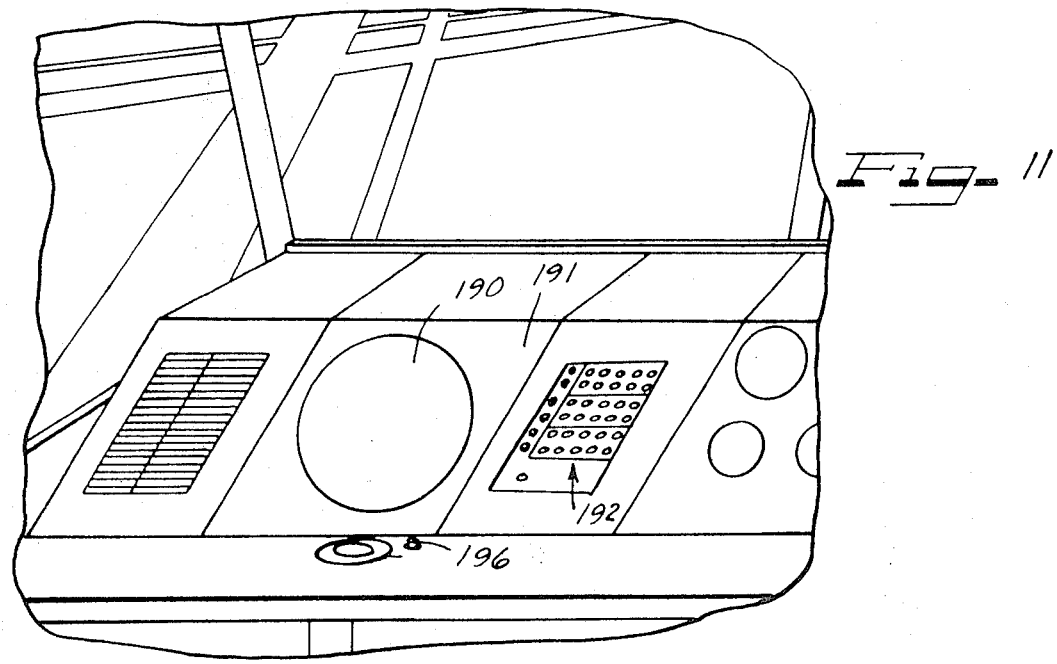

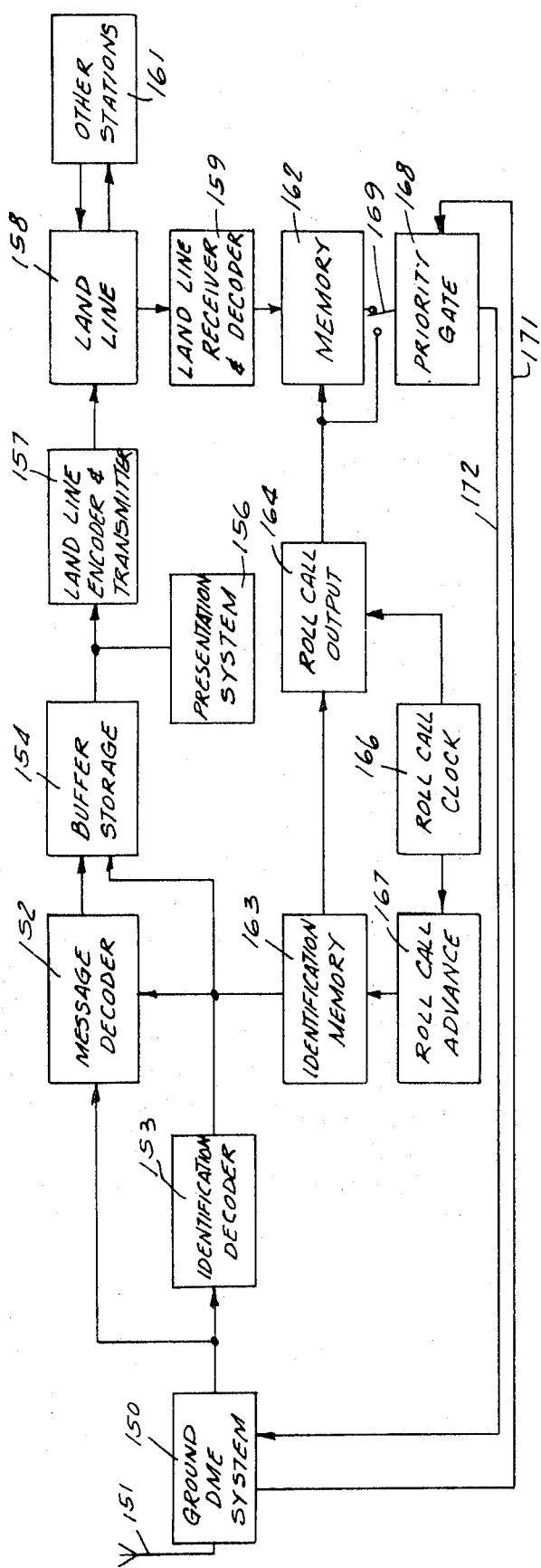
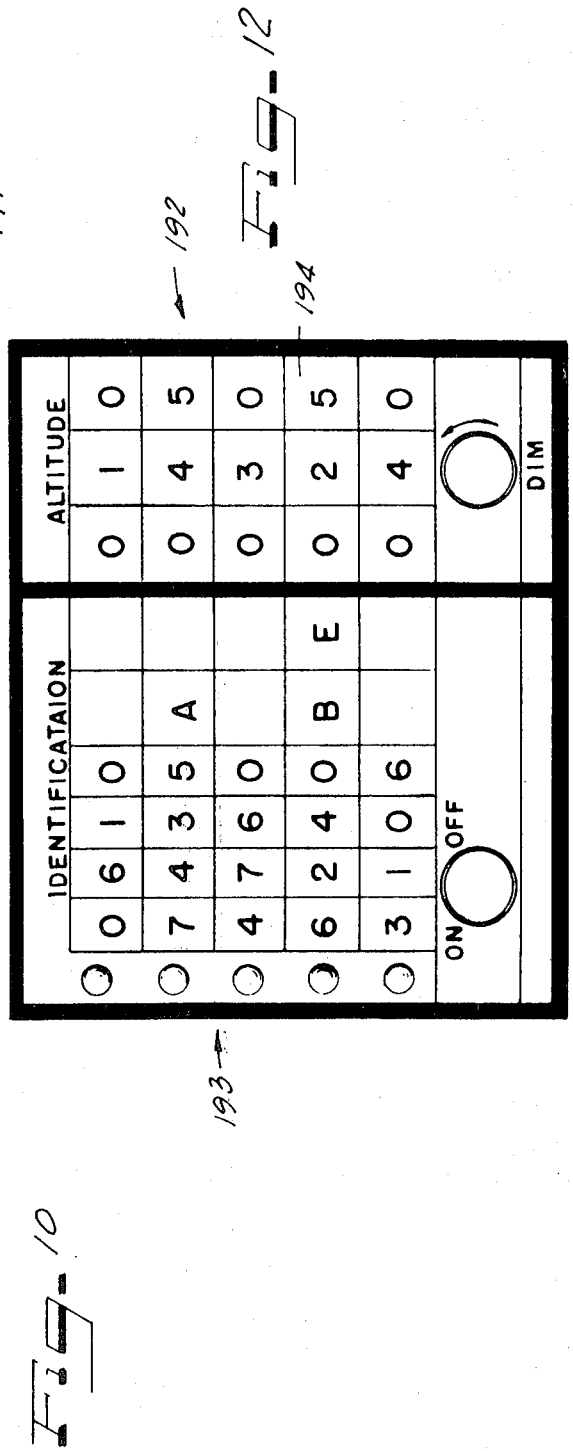
Fig. 10
Fig. 12

AIR TRAFFIC CONTROL SYSTEM

This is a division of application Ser. No. 776,209 filed Nov. 15, 1968 now U.S. Pat. No. 3,623,090.

CROSS REFERENCES TO RELATED APPLICATIONS

This invention may be utilized with an area navigation system such as described in the application Ser. No. 559,650 to Earl S. Perkins and Myron L. Anthony, filed May 31, 1966 entitled "Aircraft Navigation System", although other area navigation systems may also be used with the present invention.

BACKGROUND OF THE INVENTION

As the speed and number of aircraft have increased, greater and greater loads have been placed on the air traffic control systems being used.

For example, delays in terminal areas at the busier airports in the United States has increased greatly during recent times and it has become imperative that systems and apparatus be developed to allow the safe handling of the increasing number of aircrafts. Also, the expected use of more and more short or vertical takeoff aircraft with the continued use of fixed-wing aircraft presents particular problems that must be solved in the near future.

Prior to the implementation of radar equipment in the ATC system, separation between aircraft was accomplished by means of clearances which gave the pilot the responsibility for complying without further direction from the ground. With the advent of radar for ATC purposes, the pilot has had to follow precise vectoring instructions issued by the air traffic control on the ground in the terminal areas. Such control of numerous aircraft in the terminal area by air traffic controllers require that the air traffic controllers make a great number of control decisions and also requires that many instructions be relayed to the pilot and acknowledgements be made which require a large amount of communication between the pilots in the aircraft and the controllers on the ground. This increase in communications and control workload has contributed greatly to extended delays to air traffic operating into the busier airports, simply because the controller capability has reached its limit in the present ATC system. In addition, this type of control where the controller must continuously monitor all spots on radars and assure that he has issued suitable instructions to all aircraft, has given rise to a very nervous strain on the controllers which can adversely affect air safety.

Also, the pilots in the aircraft do not know where other aircraft in the area are located and have an insecure feeling because of their complete reliance on the communication from the ground controller for guidance and safety.

DESCRIPTION OF THE PRIOR ART

At the present time, most airliners and other aircraft operated under instrument conditions, contain radio communication equipment as well as radio navigation equipment which allows the obtaining of omnibearings from ground base transmitters and distance from distance measuring equipment. In addition, instrument landing systems include receivers for detecting localizer and glide path beams as well as marker beacons. Certain aircraft also have Loran, doppler and inertial navigation systems available. Area navigation instruments which allow an aircraft to fly courses offset from existing radio paths or to waypoints arbitrarily chosen, are also known.

However, ground based surveillance radar is the main control at busy terminal areas for regulating the flow into and out of airports both for vertical and short-range takeoff aircraft, as well as for fixed-wing aircraft.

In addition, certain ground facilities of the FAA include computers which monitor flight plans and aircraft reports in designated areas.

SUMMARY OF THE INVENTION

The present invention comprises system and apparatus for indicating to pilots in the aircraft, other aircraft which are within their area so that the pilots know where the other aircraft are located and the communication and reliance upon the ground controller is substantially reduced. Hazardous conditions are immediately indicated to the pilots so that they may take evasive manuevers to avoid collisions. Also, since with the present aircraft minimum spacings must be maintained between landing aircraft, the apparatus of the invention allows the pilot to single out a particular aircraft which he is to follow in a traffic pattern and maintain the proper relationship with this craft during flight and until touchdown. Since the pilot continuously observes his distance and bearing to the aircraft which he is following, much closer spacings may be maintained in the overall control system with greater safety. Also, since the pilot is primarily maintaining the spacing between the craft he is following, the controller on the ground serves more as a monitor, and a substantial strain caused by the responsibility and communication workload is removed from the controller, and he can function as a supervisor of the traffic and will have to step in and take action only in an emergency situation.

The system and apparatus of this invention utilizes the existing equipment on the aircraft and the ground so as to take maximum advantage of the existing equipment and to provide a simple and inexpensive system with maximum advantages.

A feature of the invention allows the identification, altitude, and position coordinates of an aircraft to be transmitted with existing equipment such as DME with slight modifications such that other aircraft may know where each craft is located. Means are provided for selecting a particular identified aircraft to follow and maintain a fixed spacing, and another feature allows the location of all other aircraft in the vicinity to be displayed to the pilot.

This system also provides that aircraft with less equipment may be integrated into the system such that the completely equipped aircraft detect the presence of a partically equipped aircraft, thus increasing the safety of both the completely equipped and the partially equipped aircraft.

Thus, a major portion of the system may be implemented without government expense since the equipment which must be added is airborne and would be provided by the aircraft owners. However, the information transmitted by the aircraft may be detected on the ground and, with modest investments in ground equipment, allows a complete air traffic control system to be provided, as for example, digital communication systems which allow automatic position reporting of the aircraft, automatic instructions to the aircraft, and allows all of the information available to be fed into the overall air traffic control computer system to completely monitor and control the existing air space.

Other objects, features and advantages of the present invention will be readily apparent from the following detailed description of certain preferred embodiments thereof when taken in conjunction with the accompanying drawings.

BRIEF DESCRIPTION OF THE DRAWINGS

FIG. 4 illustrates the method of encoding identification and position coordinates of an aircraft.

FIG. 6 illustrates an aircraft proximity measurement indicator;

FIG. 8 illustrates an aircraft proximity measurement indication when an aircraft passes another aircraft;

FIG. 10 is a block diagram of an automatic position reporting system;

FIG. 11 illustrates an automatic position reporting indicator;

FIg. 12 illustrates an automatic position reporting tabular display;

DESCRIPTION OF THE PREFERRED EMBODIMENTS

Figure 1:
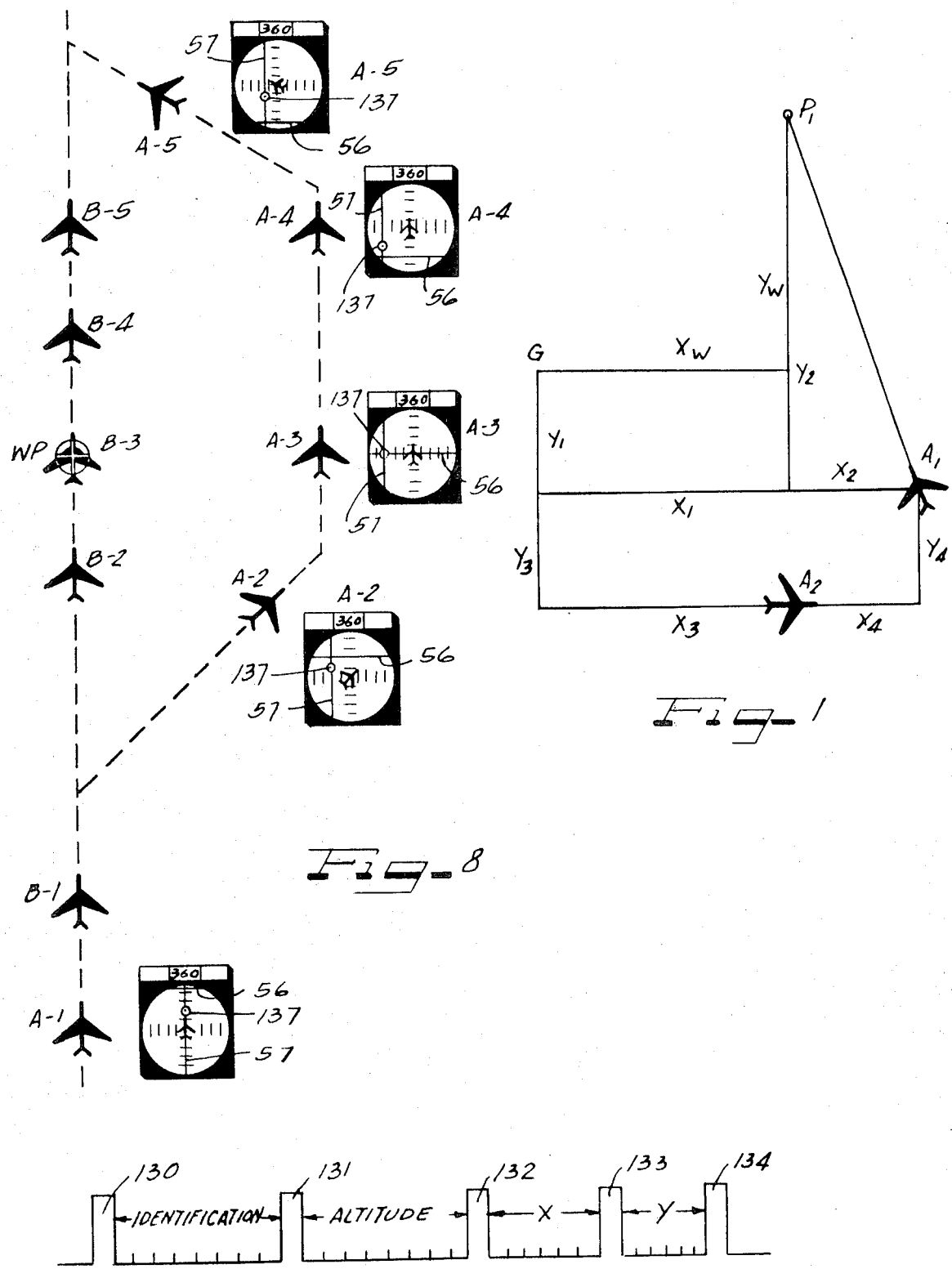
FIG. 1 illustrates two aircraft within reception distance of a ground navigation system.

The present invention utilizes the existing airborne and ground facilities to obtain an improved, safer utilization of the total air space. Many aircraft presently in operation have equipment for measuring distance and bearing from existing ground transmitters. Many aircraft also have area navigation and course-flying computer equipment, autopilots, Loran-C, inertial navigation system, doppler systems, compass systems, and automatic pilots, for example. In the present invention, facilities are added to the existing equipments so that the aircraft's position will be indicated to other aircraft and to ground stations. A first embodiment provides that aircraft with a relatively simple system will transmit information indicative of their altitude and their X and Y coordinates relative to a master area station. A more sophisticated system which would be utilized by other users would be capable of receiving the information from the first group of aircraft and presenting it on a suitable display means, and would also be capable of transmitting, in addition to the information transmitted by the first group, their identification so that a positive identification of a craft may be made in other aircraft and at ground stations. Such second group of aircraft will detect the information from the first and second groups of aircraft and present on a suitable display, the position of all aircraft in their area, and in one mode of operation, could select a particular one of the other aircraft to follow in air traffic so that the distance and direction to the craft being followed is known and may be continuously maintained. The craft being followed may also monitor the position of the craft following it so that both planes are assuring that a safe spacing is maintained without using an undue amount of air space. Ground controllers utilizing existent surveillance radar may also monitor the positions of the craft in the area and after giving suitable instructions, serve primarily as monitors and need to communicate with aircraft only when necessary. The system also provides anti-collision features wherein any unidentified aircraft which enter the selected air space surrounding a particular craft is immediately called to the pilot's attention so that the unidentified craft's position may be monitored and collision avoidance procedures implemented, if necessary.

Information, such as identification, altitude and position coordinates of aircraft in the system is detected and stored at ground stations. Such information may be used by local controllers to control local traffic, as for example, in a terminal area, and the information may also be fed into a national or even international area traffic control system for calculating times of arrival and indicating at the particular terminals what their expected traffic may be. It is to be realized, of course, that under the present air traffic control system, that flight plans are filed by aircraft and entered into computer networks. The continuous input of information from aircraft equipped as described in the present application, will allow the continuous updating of the computer memory so that information is current and thus, the information supplied by the computer network will be much more accurate and reliable than at the present time.

DETERMINING POSITION OF AIRCRAFT

FIG. 1 illustrates a pair of aircraft A1 and A2 which are equipped with suitable equipment for determining their bearing and distance from a ground station G. For example, the aircraft A1 has the coordinates X1 and Y1 from the station G, and the aircraft A2 has the coordinates X3 and Y3 from the station G. The coordinates may be aligned with the north and south line through the station, for example, and the distance between the aircrafts A1 and A2 is equal to the difference between their X and Y coordinates. For example, X4, the X coordinate of the distance between the aircrafts A1 and A2 is equal to X1 minus X3, and the Y coordinate Y4 is equal to Y3 minus Y1. It is to be realized, of course, that if the aircraft are on different sides of the station, one of the coordinates may be negative so that the absolute values are added.

In FIG. 1, the point P1 represents an arbitrary waypoint to which the aircraft A1 is being flown and has the coordinates XW and YW relative to the ground station G, and the coordinates Y2 and X2 relative to the aircraft A1. The coordinates Y2 and X2 may be solved by any area navigation computer, as for example, of the type described in patent application Ser. No. 559,650 referenced above.

It is to be observed, if aircraft and/or ground stations know the X and Y coordinates of craft relative to the station, the X and Y coordinates of the distance between planes may be easily obtained. Two other kinds of information are desirable at times. These are the altitudes of the craft to determine their coordinate Z, and the identification of a particular craft. It is interesting to note that the aircrafts' displacement and acceleration, rate of climb or descent, and other characteristics may be determined from the three coordinates and their time rate of change.

Figure 2:
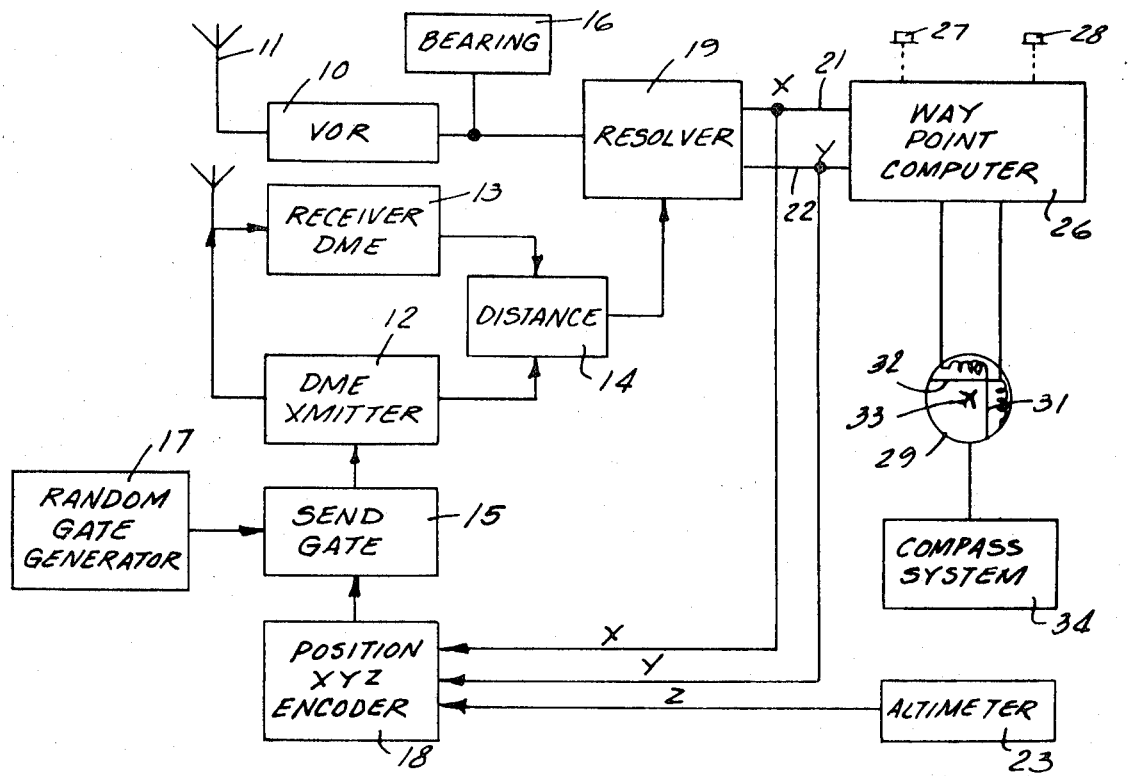
FIG. 2 illustrates airborne equipment for transmitting position coordinates of an aircraft.

FIG. 2 illustrates a simplified system for an aircraft which transmits its X, Y and Z position coordinates. The aircraft has a VOR receiver 10 connected to a suitable receiving antenna 11 and a suitable DME equipment including a transmitter 12 and receiver 13. The DME transmitter and receiver are connected to a distance indicating means 14. A send gate 15 is connected to the DME transmitter which receives inputs from the random gate generator 17 and the position X, Y, Z encoder 18. Distance measuring equipment is well known and may be such as described on page 429 of the book entitled "Electronic Avigation Engineering" by Sandretto, published by the International Telephone and Telegraph Corporation, dated 1958. It is to be realized, of course, that the VOR receiver 10 and the DME equipment, are tuned to VOR and DME equipment located at a fixed point on the ground, and the indicator 16 gives the bearing to the station, and the distance computer 14 indicates the distance to the station. A resolver 19 receives outputs from the VOR receiver 10 and the distance indicator 14, and resolves the distance into X and Y components which are supplied to leads 21 and 22. These position inputs are fed to the position encoder 18 which also receives an altitude Z from the altimeter 23.

The aircraft might also include a waypoint computer system such as designated by the numeral 26 in FIG. 2 and which receives the X and Y coordinates of the station. The waypoint computer may be of the type described in application Ser. No. 559,650, for example. A shaft 27 allows the bearing of waypoint from station to be set into the waypoint computer, and a knob 28 allows the distance from the station to the waypoint to be set into the waypoint computer. The waypoint computer calculates the X and Y coordinates of the waypoint from the aircraft and supplies it to a indicator 29 that has a vertical needle 31 which is driven by the X coordinate of the waypoint relative to the aircraft, and a vertical needle 32 which is driven by the Y coordinate of the waypoint from the aircraft. An aircraft indicia 33 is rotatably mounted at the center of the indicator and is controlled by a compass system 34. It is seen that the apparatus of FIG. 2 allows the X, Y and Z coordinates of an aircraft to be transmitted on the DME signal. The X and Y coordinates are relative to the master ground station of the area and the altitude is relative to some reference, as for example, sea level.

The method of modulating the X, Y and Z coordinates onto the DME transmitted signal will be described in greater detail hereinafter, but it should be realized that generally DME signals transmitted by aircraft comprise microwave pulse pairs of three microseconds each with the pairs spaced one-thirtieth second apart and that actually the transmitter is transmitting only 0.18 percent of the time. The position information may be encoded on the DME signal during the remaining 99.82 percent of the time when the distance determining pulses are not being transmitted.

The simple system of FIG. 2 could be installed on many existing aircraft and they would continuously transmit the X, Y and Z coordinates. Such information would be detectable by aircraft with more sophisticated systems forming a part of this invention, and such aircraft would be aware of the presence of the unidentified aircraft and avoid them.

Figure 3B:
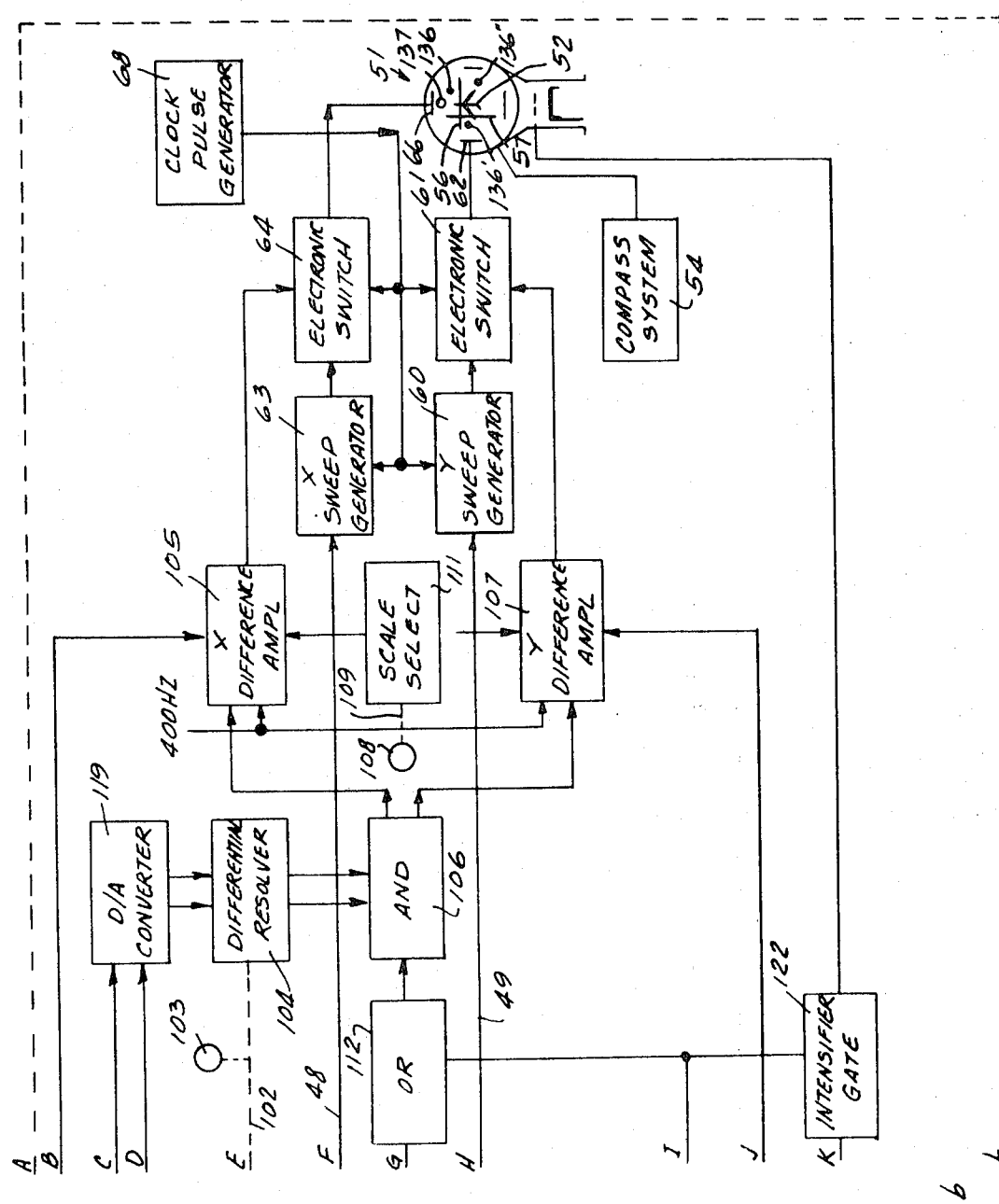
FIG. 3 illustrates the equipment of an aircraft for transmitting and receiving identification and position coordinates.

A suitable system for aircraft with the more sophisticated system is illustrated in FIG. 3.

AIRCRAFT PROXIMITY MEASURING/AIRCRAFT PROXIMITY REPORTING SYSTEM

FIG. 3 illustrates the airborne equipment for an aircraft equipped for proximity measurement and proximity reporting. An ARNAV system 41 which might, for example, be of the type described in Ser. No. 559,650, receives an input from a DME system 42 proportional to the aircraft's distance from a master radio station, and receives a second input from a VOR receiver 43 which is tuned to the master station and gives a bearing indication. The ARNAV system 41 produces a pair of outputs equal to the X and Y coordinates of the aircraft from the ground station and supplies these respectively to the leads 46 and 47. The ARNAV system 41 also produces a pair of X and Y coordinates relative to a waypoint and supplies these to the leads 48 and 49. It is to be realized that the selection of the waypoint is done in the ARNAV system 41, as described, with reference to FIG. 2 above in the copending application Ser. No. 559,650. A cathode display device 51 has an aircraft indicia 52 which is controlled electronically by a compass system 54. The aircraft 52 rotates at the center of the face of the cathode ray tube 51 and continuously indicates the orientation of the aircraft relative to north. The aircraft indicia 52 is electronically controlled to rotate it by suitable electronic deflection means in a well known manner.

The cathode ray tube 51 has a pair of traces 56 and 57 whose position indicate the Y and X coordinates of the aircraft relative to the selected waypoint. The intersection point of the traces 56 and 57 represent the position of the waypoint relative to the aircraft. The output of the ARNAV system 41 on lead 49 controls the position of trace 56 through the Y sweep generator 60, the electronic switch 61, and the deflection plate 62. The X output of the ARNAV system is applied through lead 48 to a sweep generator 63 which supplies an input to the electronic switch 64 which is connected to a deflection plate 66 to control the X trace 57. A clock pulse generator 68 is connected to the sweep generators 63 and 60 and electronic switches 61 and 64 to provide a timing control.

The DME 42 is connected to a suitable antenna 71 of conventional type and includes a transmitter 72 that is connected to the antenna 71, and a preselector 73 which is connected between the DME receiver 74 and the antenna 71. The preselector 73 is offset + or − 63 Mhz from the transmitter frequency, as conventional. The DME receiver supplies an input to measurement circuits 75 which is also connected to the DME transmitter 72 and supplies an output on lead 76 to the ARNAV system 41. A distance display 77 is also connected to the measurement circuits 75 and indicates the aircraft's distance from the ground station. The DME system disclosed thus far comprises a conventional DME system which is well known in the art. A preselector 78 is connected to the antenna 71 and is tuned with the DME transmitter 72 so that it is capable of receiving signals at the transmitted frequency. The preselector supplies an input to an aircraft proximity measuring receiver 79 which is connected to the DME transmitter 72 to receive a blanking pulse to blank it during times when the DME transmitter 72 is transmitting. At all other times, the APM receiver 79 will receive input signals through the antenna 71 and preselector 78 which are being emitted by other aircraft equipped with similar aircraft proximity measuring equipment. It is to be noted that the conventional DME receiver is offset by 63 Mhz from the transmitted signal of the DME transmitter, whereas the APM receiver 79 is tuned to receive signals at the same frequency as the DME transmitter so as to allow it to intercept signals radiated by other aircraft to determine their positions and identification. The leads 46 and 47, which carry the X and Y coordinates of the aircraft relative to the ground station, are supplied to an aircraft proximity reporting encoder 80. The X and Y coordinates from other sources such as inertial navigation systems or doppler systems indicated generally as 83 may be connected to terminals 81 and 82 to connect and supply Y and X coordinates to the encoder 80. An altitude transducer 84 also supplies an input into the encoder 80 and an identification generator 86 also supplies an input to the APR encoder 80. The APR encoder 80 is connected to a send gate 87 which also receives inputs from a random gate generator 88 and an identification decoder 89. The output of the send gate 87 is connected to the DME transmitter 72 by lead 91. The ARNAV system 41 which might be, for example, a system such as described in application Ser. No. 559,650, is connected by a lead 100 to a track resolver 101. A shaft 102 has a track setting knob 103 which is connected to the track resolver 101 and to a differential resolver 104. An "and" gate 106 is connected to the differential resolver 104 and supplies an output to an X difference amplifier 105 and a Y difference amplifier 107. A scale select knob 108 has an output shaft 109 that controls a scale select 111 that is connected to the difference amplifiers 106 and 107, respectively. The "and" gate 106 also supplies inputs to the X and Y difference amplifiers 105 and 107 to control the orientation of the traces 56 and 57 on the display tube 51.

An "or" gate 112 feeds an input to the "and" gate 106 and receives an input from an altitude gate 113. The altitude gate receives an input from an altitude range 114 which may be selected to a desired altitude by the knob 116 and input shaft 117. An intelligence decoder 118 receives the output of the APM receiver 79 and supplies an input to the altitude gate 113 and an output to a converter 119 which is connected to the differential resolver 104. The decoder 118 also supplies an input to an identification decoder 121 and to an intensifier gate 122. The identification decoder 121 is connected to the "or" gate 112. An identification selector 123 is connected to the identification decoder 121 and has a control shaft 124 that has a selector knob 126.

In the system of this invention, all aircraft equipped with aircraft proximity measuring apparatus, according to the invention, tune their DME equipment to the master station in the area and transmit their identification, altitude and X and Y coordinates relative to the master station. This information is detected by the aircraft proximity measuring receiver 79 of other aircraft which uses it to determine whether a dangerous condition exists and also for maintaining position relative to a selected aircraft, if desired. Certain aircraft utilizing the simpler system disclosed in FIG. 2 will be detected by the aircraft with the aircraft proximity measuring system, and will be presented on the cathode ray tube 51 so that the aircraft may avoid them. The presentation of aircraft shown in the unidentified aircraft mode, are presented as small bright targets which leave a trail thus showing the direction of flight.

The identification and position coordinates are transmitted by the DME transmitter and the aircraft proximity measuring signals are continuously transmitted during the course of the flight. The signals are interlaced on the normal DME frequency and are omni-directional. They are transmitted randomly as, for example, at three second intervals or they may be transmitted based on a roll call from a ground control center. In the APM system each aircraft is identified by a disrete code which is permanently assigned to an aircraft and might be a four-digit number plus two letters. This number might be similar to the permanent tail registration assigned to an aircraft by the F.A.A. The position coordinates transmitted by the aircraft are altitude, and the X and Y coordinates relative to the master station.

This information may be encoded on the DME transmitted signal since the DME signal is used to obtain the aircraft's distance from the station and normally comprise a pair of pulses that are randomly transmitted. The pulses might be three microseconds in length and might have a spacing of one-thirtieth of a second. Therefore, the DME transmitter in the aircraft is on only 0.18 percent of the time. This leaves 99.82 percent of the time when the transmitter is not transmitting. The identification and position information may be transmitted during the time when the distance measuring pulses are not being transmitted.

As shown in FIG. 4, framing pulses may be transmitted by each aircraft on its DME transmitter with a fixed timing with its distance measuring pulses, and the identification, altitude, and X and Y coordinates relative to the master station may be transmitted between the framing pulses. For example, between the framing pulses 130 and 131 the identification of the aircraft may be transmitted, between the framing pulses 131 and 132, the altitude of the aircraft may be transmitted, between framing pulses 132 and 133, the X coordinate of the aircraft may be transmitted, and between the framing pulses 133 and 134 the Y coordinate of the aircraft may be transmitted. The information may be encoded by dividing the time between the framing pulses into time slots which represent a binary code, for example. The binary code for altitude, by way of example, for 23,000 feet is represented by the binary number 10111 and this binary number may be transmitted in the time slots between the framing pulses 131 and 132. In a similar manner the identification and the X and Y coordinates of the aircraft relative to the station may be transmitted between the respective framing pulses.

Since the encoding and transmission of binary information is well known to those skilled in the art the detailed circuitry for encoding such information is not disclosed but is readily available in the published art. It allows all equipped aircraft to pick up the information from all other aircraft and present the position of the other aircraft on the scope 51. The decoder 118 decodes the information on the received signals and passes it to the D/A convertor 119 which passes it through the differential resolver 104 and "and" gate 106 to present it as indicia 136 on the cathode ray indicator 51. The resolver 104 assures that the indica of the various aircraft are oriented properly on the screen relative to the waypoint and aircraft. It is to be noted that a number of indicia 136, 136' and 136" are presented on the cathode ray tube 51 and represent different aircraft.

It is desirable at times to select a particular aircraft to follow it. This may be accomplished with the present invention by selecting the identification of a particular aircraft with the knob 126 which controls the identification selector 123 that supplies an input to the identification decoder 121. When the decoder 118 supplies an input to the identification decoder 121 which corresponds to the identification of the selected aircraft, the identification decoder 121 will produce an output to the "or" gate 112 which will have a distinctive signal to identify the selected aircraft on the cathode ray tube 51. For example, the distinct presentation might be a signal with a circle about it indicated by the numeral 137 on the cathode ray tube.

It is to be realized that the aircraft being followed may, if desired, select the identification of the craft following so that it will be presented with a unique presentation so that he may monitor the distance and position of the two craft.

The altitude range 114 allows the pilot to select only those aircraft within certain altitudes to be presented on the cathode ray tube 51. For example, it might be desired to display only those aircraft which have an altitude within 2,000 feet of the airplane. The knob 116 may be set to the 2,000 foot range, and only those aircraft which fall in this range will be presented on the cathode ray tube 51. This allows the pilot to ignore other aircraft at remote altitudes which present no hazard of navigation or traffic.

Figure 5:
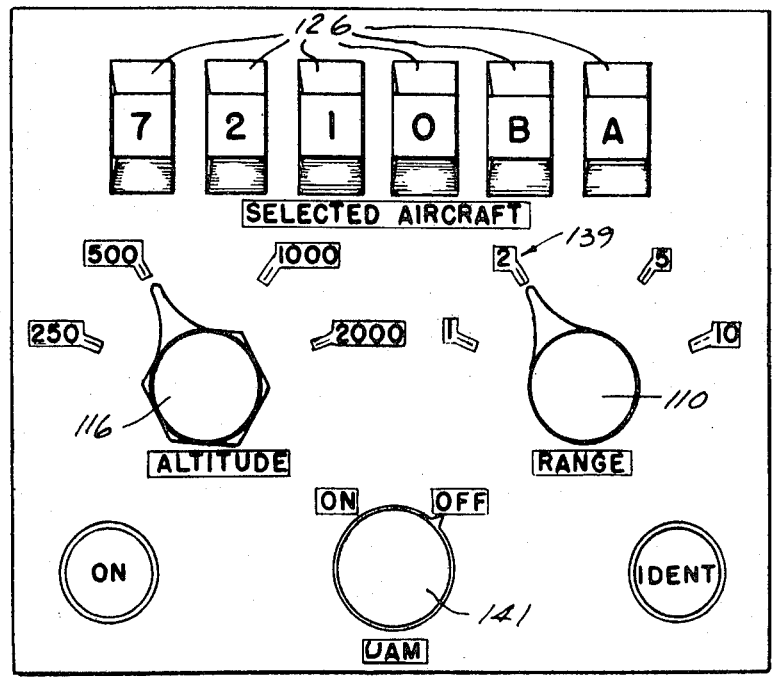
FIG. 5 illustrates the aircraft proximity measurement control panel.

FIG. 6 illustrates, in greater detail, the aircraft proximity and navigation indicator 51. FIG. 5 illustrates an aircraft proximity measuring control panel. The indicator 51, as shown in FIG. 6, has scale markings 138 and the distance between these markings may be selected by knob 108 against the indicia 139. For example, during enroute flying the selected range might be ten nautical miles, whereas in the terminal area, the range might be set to a scale of one or two miles. The identification select means may be thumbwheels 126 which allow the identification number and letter combination for the selected aircraft to be chosen. This establishes the identity of the aircraft to be presented on the indicator 51 with a distinctive presentation such as with a circle, as shown in FIG. 6, so that the pilot may maintain a desired position relative to the selected aircraft. A selected aircraft mode switch 141 allows the pilot to remove the unidentified aircraft 136 from the indicator 51, as for example, in a terminal area so that only the selected aircraft indicated by the presentation 137 will be visible on the indicator 51.

In use, it is seen that the system of the invention may be utilized in many applications. For example, for approach and landings, it is necessary that aircraft maintain close and precise spacing under all weather conditions to allow an airport to achieve its maximum physical capacity. This precise spacing cannot be accomplished by the controller with visual estimates either by using radar or by sighting the aircraft from the control tower. Neither can it be accomplished consistently by visual estimates by the pilot even in the best of weather conditions. The invention allows a substantial increase in the density and safety of aircraft operations by allowing the pilots to maintain accurate separation at all times during approach and landings.

The invention is also very valuable for vertical or short take-off aircraft, as it allows ARNAV separation to be maintained.

The ground controllers may assign desired separation to aircraft or the TRACON computer may be utilized to calculate the optimum spacings. Other methods of calulating the required spacings such as the FAA Computer Aided Approach System (CAAS) may be available to the controller. When the optimum separation is determined the controller issues instructions to each aircraft telling them which craft they are to follow and the spacing to be maintained.

Figure 7:
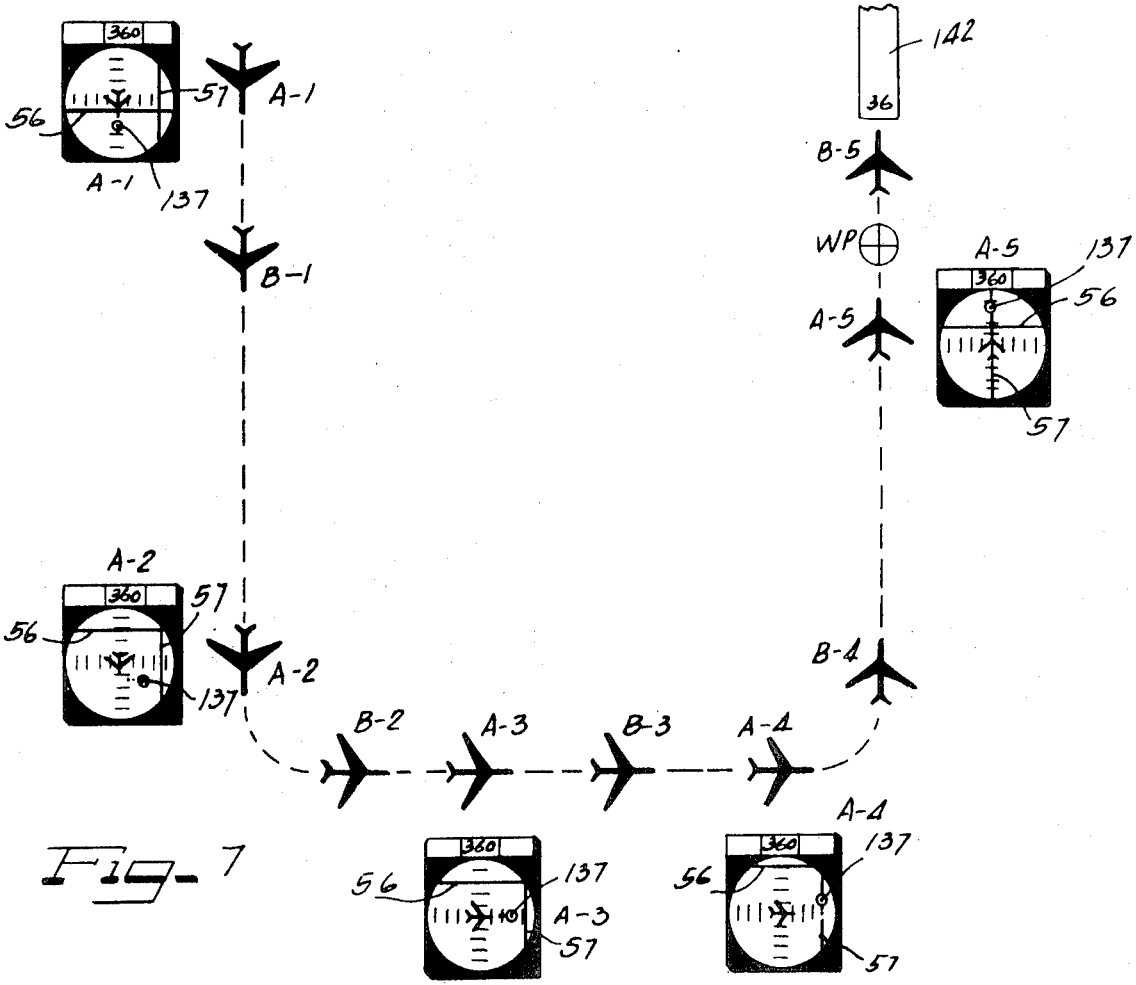
FIG. 7 illustrates the relationship of a pair of aircraft and the presentation on the aircraft instrument of FIG. 6 for the different positions.

FIG. 7, for example, is a plan view of a pair of aircraft A1 and B1 which are to be landed on a runway 142. A waypoint WP has been set into the ARNAV computer 41. In the upper lefthand presentation the aircraft A1 is following the selected aircraft B1 on the downwind leg and indicia 56 and 57 indicate that the aircraft is to the right of the waypoint. The indicia 137 of the selected aircraft is maintained a predetermined spacing from the aircraft indicia as determined by the instructions from the ground controller and by the scale to which the indicator 51 has been set. The indicia at the lower left of FIG. 7 illustrates that the aircraft B2 has starteed a left turn and the pilot of aircraft A may maintain his spacing visually and turn on base when the spacing is appropriate. On the base leg, the positions of the aircraft A and B is shown at the bottom of the drawing and designated A3 and B3. It is to be noted that the indicia 56 and 57 shown the relationship of the aircraft to the waypoint and the selected aircraft. At A4 and B4 the selected aircraft has turned onto final and the position is indicated on the indicator 51. At position 5 the aircraft B is close to touchdown and the aircraft A is on final and has a spacing such that aircraft B may land and turn off of the runway before the aircraft A touches down.

It is seen that the indicator allows the pilot of aircraft A to maintain his spacing without detailed intructions from the ground. This eliminates much of the communication presently necessary wherein the ground controller monitors on radar the positions of the two aircraft and relays information to the pilot in aircraft A. Especially under instrument landing conditions, where the aircraft B is not visible, the pilot in aircraft A does not know exactly where the aircraft B is. The invention allows positive identification and location of the aircraft B at all times and the pilot in aircraft A needs much less communication and instruction from the ground controller. For example, when aircraft B turns on the base leg at position 2 in FIG. 7, the pilot in plane A knows that the may anticipate a turn on the base leg so as to maintain the proper spacing. He may also maintain this spacing since the aircraft B is visible upon his indicator and much of the workload presently carried by the controller on the ground may be accomplished by the pilot, who also has greater confidence in the system, since he has a continuous presentation of the situation.

The invention is also useful during departures from airports and a spacing may be maintained in a manner similar to that described with reference to approach patterns.

During enroute flying, the invention allows accurate spacing to be maintained between aircraft cruising at the same altitude in the same direction. For example, on long transcontinental flights or overocean flights, and where continuous ground radar monitoring is not available, the present invention allows safe and accurate spacing of aircraft.

FIG. 8 illustrates an aircraft A passing an aircraft B. At position 1 the aircraft A is behind the aircraft B but notes that he is closing on the aircraft B because the speed of the aircraft A is faster. Aircraft A makes a turn to the right as shown at position 2 and when he has reached a position sufficiently offset from aircraft B, he turns to a parallel course, as shown at position 3. At position 4 aircraft A has passed sufficiently ahead of the aircraft B to turn back to the left toward the desired track. At position 5 the aircraft A is intercepting the desired track and will turn back onto the track and has safely passed aircraft B.

Figure 9:
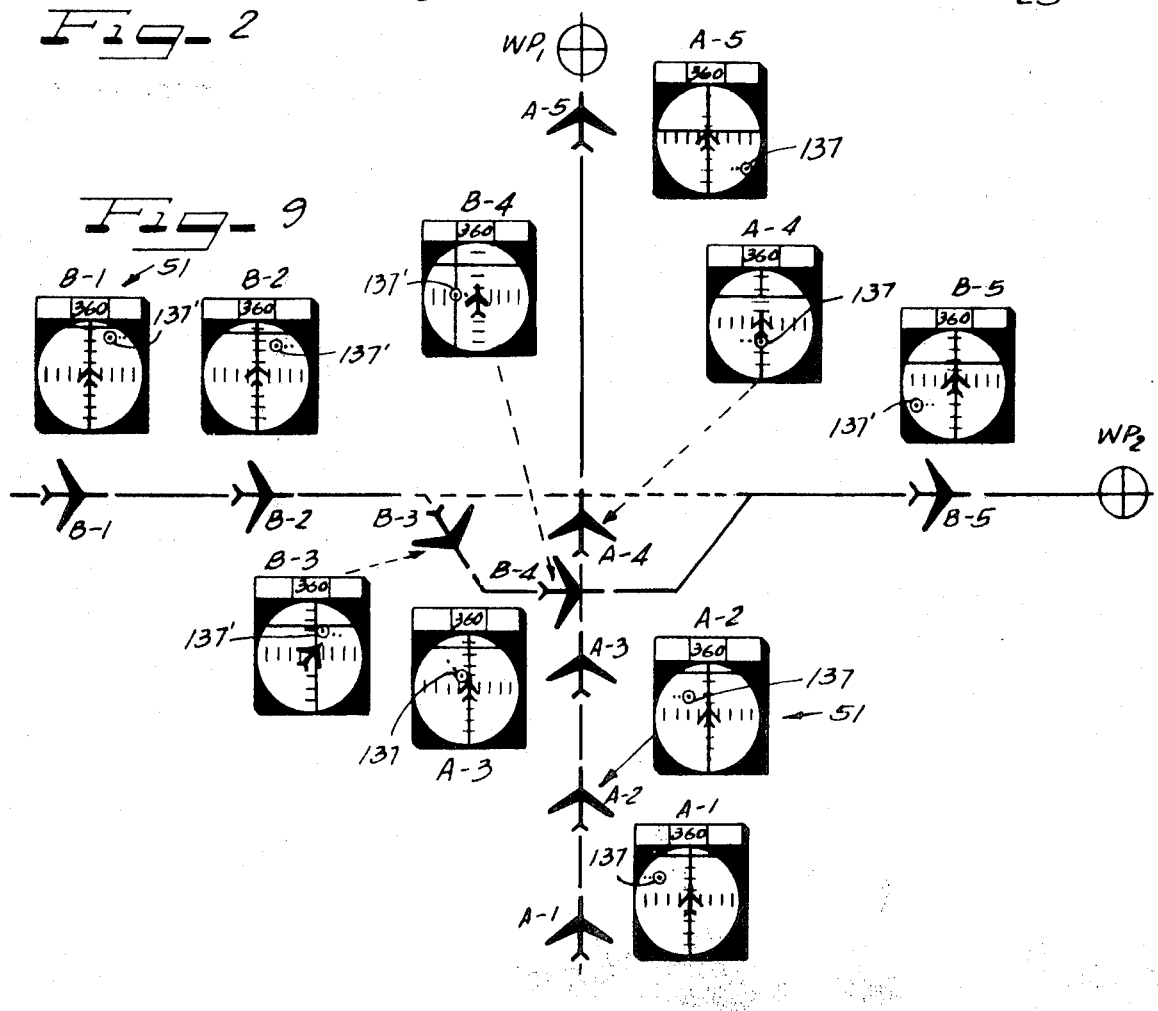
FIG. 9 illustrates an aircraft proximity measurement indication presentation for a collision avoidance maneuver.

FIG. 9 illustrates the aircraft proximity measuring indication during a collision avoidance maneuver between a pair of aircraft A and B. In FIG. 9 each of the aircraft contain aircraft proximity measuring equipment and indicators, according to this invention, although it is to be realized that if either of the aircraft has the aircraft proximity measuring system and the other aircraft merely has a guard system such as disclosed in FIG. 2, that the collision avoidance maneuver may be made by the proximity measuring equipped aircraft. At positions 1, aircrafts A and B are flying toward different waypoints WP1 and WP2, respectively. Aircraft B observes an indicia 137' forward and on a closing course. At the same time, aircraft A, at position 1, observes an indicia 137 forward and on a closing path. The respective aircraft continuously monitor the position of the other aircraft and under established and conventional rules of the road, aircraft B takes a collision avoidance maneuver, as shown. It is to be realized, of course, that rules of the road and procedures may be adaped as desired, for maximum efficiency and safety. FIG. 9 merely illustrates a particular manner in which the invention may be utilized to prevent a collision.

As shown in FIG. 6, a plurality of unidentified aircraft 136, 136', 136'' may be detected on the indicator 51. The aircraft may know that from their trail caused by the memory of the cathode ray tube, the direction of the unidentified aircraft and will take collision avoidance maneuvers where necessary or desired for safety.

In this mode of operation, the pilot selects a safety envelope in which his aircraft is always in the center. The selected dimensions of the envelope will depend upon the traffic environment and, for example, in a terminal area the pilot would normally select a smaller envelope than that which he would select when enroute. The range control 108 is on a control panel illustrated in FIG. 5, which permits selecting distances ranges of 1, 2, 5 or 10 nautical miles. The altitude selector 116 allows altitudes of 250, 500 1,000 or 2,000 feet of the aircraft to be selected. It is to be noted that the range established by the knob 110 may differ from the range of the indicator 51 since the range of the instrument 51 is chosen by the knob 108.

The aircraft proximity measuring indicator will display the positions of all aircraft within the safety envelope relative to the given aircraft. These positions are given as plan view with the position of the given aircraft always in the center. The pilot will know that only those aircraft are displayed which are within the distance and altitude parameter which is selected for a safety envelope. The display for all targets will be updated every three seconds or other suitable time as determined by the equipment and will have a trail effect due to the persistence of the cathode ray tube.

The X, Y and Z coordinates transmitted by all aircraft, as described above, are monitored constantly by every other proximity measuring equipped aircraft tuned to the same DME station. The proximity measuring computer compares those coordinates with the X, Y and Z coordinates of the given aircraft and selects only those which are within the parameters of the safety envelope as established by the pilor with knobs 116 and 110. By reference to the aircraft proximity measuring indicator, the pilot in the aircraft will be able to observe the actual positions of other aircraft relative to his aircraft in terms of two-dimensional measurement. The pilot will not be concerned with the altitude of the other aircraft since he knows that he sees only those aircraft which are in his selected altitude strata, as determined by the setting of knob 116.

Before entering the area serviced by the next master ground station such as VORTAC or VOR/DME along the route of flight, the pilot will change his navigation equipment to the frequency of that station. When this occurs many aircraft proximity measuring equipped aircraft in the serviced area of the new station will be displayed before a hazard actually exists.

In the event a target appears to be making a track toward the center of the proximity measuring indicator, the pilot of the craft may assume that the intruder is on a course converging with that of his craft. The pilot will try to visually spot the intruder, if under clear conditions, and he will have the bearing and distance of the craft from his indicator.

When flying in weather conditions which do not permit visual spotting of an intruder on an apparent converging course, the pilot may follow the following steps:

1. Reduce the envelope size to determine if the intruder would be screened out by altitude or range.
2. Call the appropriate ATC facility for verification that proper separation is being provided his aircraft in relation to the intruder.
3. If a potential collision hazard still appears to exist take avoiding action by altering course to as to pass the intruder with safe lateral separation.

GROUND SYSTEMS AND CONTROLS

The air traffic control system presently in operation in the United States is primarily based on the use of radar for separation. The system requires many long range radar systems to cover the enroute area and short-range radar systems to give coverage in the terminal areas. Because many aircraft do not present good radar reflections and since radar identification is frequently difficult, a program has been in effect for some time to encourage operators to equip their aircraft with transponders. At the present time only a small percentage of the total aircraft fleet is so equipped. Transponders enhance the display of radar data in the ATC facilities, in that targets not previously picked up are displayed and targets are intensified. The transponder also allows some identification.

However, there are certain inherent difficulies in any radar control system which cannot be eliminated. A report by the Air Transport Association of America entitled "Report of New York Air Traffic Delay Study", dated February 1968, discusses a number of these problems. The problems in the air traffic control system are:

1. Lack of sufficient low altitude coverage, without a substantial increase in the number of radar stations.
2. Lack of adequate returns from aircraft not equipped with transponders.

3. Unreliability, failure, or malfunction of the radar equipment.
4. A heavy workload of the controller and pilot in communication to confirm the aircrafts' position.
5. Inadequate radars in the ATC System which were not designed for controlling air traffic.
6. Blind spots in the radar pattern.
7. Lack of discrimination between two targets which are within 3° of each other relative to the radar site.
8. Inaccuracies in the radar presentation. For example, if radar has a 3° accuracy, the position of an aircraft at 114 n.m., would have a circle of error of about 6 n.m radius (12 n.m. diameter).
9. The relatively low, fixed data rate (depending on the speed of the antenna rotation), may not satisfy the requirements for separation of high speed aircraft.
10. Large target "slashes" in displays may cause targets to overlap and require larger separation between targets.
11. Clutter caused by precipitation or from obstructions.
12. Interference from other radars, ECM or other radiation sources.
13. Reduction in signal strength under certain atmospheric conditions.
14. Propagation conditions which cause extraneous targets to be displayed.
15. False targets caused by reflections and overlaps.
16. Two transponder-equipped aircraft when within 3.3 nautical miles of each other and are swept simultaneously by the same interrogation beam, will have reply pulse trains that overlap and become mixed within the decoder, thus producing "garbling". Depending upon the exact amount of overlap, garbling may produce (a) false target between normal targets (b) flase emergency alarm (c) cancellation of all or part of one or both targets, i.e., "lost" target (d) false data readouts of identification and/or altitude, or (e) false identification responses from aircraft.
17. Transponder signals blanked because the aircraft is turning.

The above deficiencies in radar systems are reasons why radar will not be adequate to handle the expected air traffic volume. Therefore it is imperative that improved systems be developed.

At the present time there are only 89 enroute radar facilities and 154 local, short-range airport radars with their 567 VORTAC and VOR/DME facilities plus an additional 185 VOR-only facilities which are to be converted to VORTAC in the near future. Thus, there is over three times as much air space covered by VORTACs as compared to radar in the Continental U.S. airspace. A relatively small increase in the number of VORTAC - VOR/DME stations will permit almost complete converage of the significant navigable airspace over the Continental United States.

Because of the radar problems listed above, air traffic controllers must adopt extreme precautionary measures to prevent their capabilities from being exceeded. Such measures include restrictions on the number of aircraft permitted in a sector at any given time, and the use of large separation criteria. Both of these have a direct bearing on the total capability of the ATC System to accommodate aircraft. This results in aircraft being delayed both in the air and on the ground, even during good weather conditions.

The current planning for the U.S. National Airspace System anticipates the continued use of ground-based radar as the main tool for air traffic control, with expanded use of transponders. The implementation by the Federal Aviation Administration of the planned ACT computer systems will substantially relieve controller of most of his "non-control" functions, leaving him more time to concentrate on the control of aircraft. These computer systems have the speed, capacity, and power to handle the future air traffic volume presently contemplated and will improve the air traffic control situation. However, if radar/transponder combination is still anticipated to be the essential positional input to the ATC System the optimum use of the airspace will not be made.

The proposed aircraft position reporting system of this invention will greatly improve the air traffic control system and allow a great deal more effective service to a larger number of aircraft than at present. The extensive coverage and better aircraft identification and detection of the present invention will provide the controller and pilot with more reliable information and substantially reduce the need for forced communication between the controller and pilot. The Automatic Position Reporting System of this invention does not use radar techniques and is not subject to the problems of radar which are outlined above.

The Automatic Position Reporting System of this invention is compatible with the aircraft proximity measuring system described above.

FIG. 10 illustrates the ground DME 150 connected to a suitable antenna 151 which operates as a distance transponder in a conventional fashion and also detects the identification and X, Y and Z coordinates from an aircraft equipped with aircraft proximity measuring equipment. A message decoder 152 receives an output from the DME System 150, and an identification decoder 153 also receives an output from the DME System 150 and supplies an input into the message decoder 152. A buffer storage 154 receives inputs from the message decoder 152 and the identification decoder 153. A presentation system 156 is connected to the output of the buffer storage 154. A land line encoder and transmitter 157 receives the output of the buffer storage and transmit the information as to the identification and position coordinates of the various aircraft to land lines 158 which distribute it to various computer and control centers 161. Land line receiver and decoder 159 receives inputs from the land line 158 which have been supplied from other stations 161 and decodes the information and supplies it to a memory 162. An identification memory 163 receives input from the identification decoder 153 and supplies an output to the roll call output 164 which also receives an input from the roll call clock 166. A roll call advance 167 also receives an input from the roll call clock 166 and supplies an output to the memory 163. A priority gate 168 receives an input from the memory 162 or an input from the roll call output 164 through switch 169. The priority gate receives a trigger from the ground DME 150 through lead 171 and supplies an output on lead 172 to the ground DME system 150.

The aircraft position reporting system of FIG. 10 may take three forms. Form 1, identified as Model A may provide for the transmission of digitized aircraft position reporting messages from the DME station to the air traffic control facility. The encoder 157 encodes the aircraft position reporting messages in to a format acceptable to computers, for example. The decoder decodes the aircraft position reporting message for transmission to aircraft traffic control facilities and a memory module stores the aircraft position reporting messages for transmission to the air traffic control facility. The roll call device regulates the time of position reports and identification of the aircrafts to the ground station.

The automatic position reports transmitted at random, as discussed in the aircraft proximity measurement system above, are further transmitted to air traffic control facilities by utilizing the DME ground stations. When the pilot of an aircraft which is equipped with the invention, tunes his navigation receiver (VORTAC, TACAN, or VOR/DME) to the frequency of the selected ground station, for normal navigation purposes by choosing the appropriate DME frequency, he is automatically connected into the aircraft position reporting system. When the DME interrogator "locks on" to the ground station, the identification code assigned to the aircraft is transmitted to the ground station, automatically, where it is entered into the memory 163 from which it will be recalled by the DME stations's roll call circuitry. When the aircraft identification has been stored in the DME station memory, approximately every 3 seconds, the ground DME transmitter will be used to interrogate the station on the normal DME frequency. The group interrogations will be interlaced with the distance and bearing information 45 times each second, for example, and this rate will be synchronized with the reference pulse burst which occurs 135 times a second in TACAN transmitters. In the case of DME only (not VORTAC), no synchronization is necessary. Each of the 45 interrogations comprises a discrete coded identification to a particular aircraft, which has entered its identity code into the ground memory by an initial air-to-ground interrogation. Each aircraft which has so entered the system is interrogated every three seconds. Since 45 aircraft are interrogated each second, the system has a capacity of 135 aircraft, which currently exceeds the capacity of the DME system. If there should be no transmissions from an aircraft, its identification is dropped automatically from the roll call. This is to eliminate automatically those aircraft which fly out of range of the DME.

If, on the other hand, an aircraft is not interrogated by a roll call from the ground DME station, it will revert automatically to a random transmission of its aircraft position message. When the roll call message reaches the aircraft, it responds by transmitting, again, its identification, and its distance and altitude coordinates relative to the station. This information is encoded into the APR message and transmitted at high speed to the DME station, interlaced on the DME frequency. During this period, the normal functions of the DME equipment will continue to operate as scheduled by the roll call equipment.

The aircraft position reporting message is received at the DME ground station and is encoded into a suitable format as, for example, such as used in ATC facilities. At United States' NAS-stage A Air Route Traffic Control Centers, a central computer complex exists. A computer such as the IBM 9020 is provided in some such centers, for example. Air traffic control facilities in other countries are also equipped with computers. In certain traffic control centers, sophisticated computers are used because the facility has been automated. Information received from the aircraft according to this invention may be easily fed into and out of the computerized air traffic control centers. At other stations such as control towers and flight service stations, smaller computers or presentation devices may be utilized to present the aircraft position reporting data. The interface of the various computers and implementation devices is a simple problem at this state of the art and standard encoding and utilization apparatus may be installed.

In those air traffic control centers where an adequate display system is presently available, such as at a NAS-stage A ARTCC station, the position data may be displayed as small bright dots, with identification and altitude in alphanumerics alongside the target and linked to it by a leader in the same manner as is used in the ARTS, SPAN, TRACON-C and NAS displays.

At control towers or flight service stations, where radar displays are not installed, suitable bright tube displays may be provided. Such display equipment may be provided at low-density control towers or flight service stations and may consist of two sections. As shown in FIG. 11, a large "hi-brite" CRT display of the PPI-type 190 is mounted on a suitable presentation chassis 191. The flight data would be displayed on the aircraft position reporting tabular display, illustrated in FIG. 12, and designated generally as 192. This display has an identification section 193 and an altitude section 194. The data are associated electronically with the target on the cathode ray tube 190, and when the track ball on the radar display moves the position marker over the desired target and an "ENTER" pushbutton 196 is depressed, the light beside the associated data on the tabular display 192 will flash. When the controller is finished with the data, the position marker automatically stops flashing. The data on the display 192 would be entered automatically and would be removed automatically by the computer when the landing has been completed.

As shown in FIG. 11, the typical aircraft position reporting control tower or flight service station would give a compact and efficient presentation of the information according to the various aircraft.

The slant range error correction results from the fact that the DME system of the aircraft, measures the slant range rather than the distance to the projected position of the aircraft upon the ground. This slant range error may be corrected by suitably programming the computer at the ATC as a function of the altitude. Since the altitude information is received by the ground control stations, the slant range error may be removed in a simple and well known manner.

The aircraft position reporting system of this invention does not use radar as its primary information input and it is therefore not affected by the problems normally met with radar, and the displayed data is much more reliable. The aircraft position reporting system provides a current and up-to-date picture of the complete air traffic situation because of the increased frequency of the reports, and due to their extremely high reliability. Thus, the aircraft position reporting system may be used as a continuous check on the accuracy of the radar system. Also, the aircraft position reporting system will serve as a reliable backup surveillance system when the radar system fails.

Many areas of the Continental United States are not covered by the present radar system and the present invention allows information to be received on aircraft at nearly all locations.

AUTOMATIC INSTRUCTION REPORTING (AIR)

One of the major problems in today's air traffic control system is the congestion of the radio communication frequencies. Studies have shown that a large proportion of air traffic delays are caused by the difficulties in the controllers communicating with the aircraft in their vicinity. Communication problems arise due to poor reception caused by interference, necessitating the frequent repetition of calls, misunderstanding of ATC instructions, selection of incorrect frequency, and others. These difficulties generally occur at times when the traffic density is above normal and/or the weather is bad, thus compounding the problem. Frequently, many aircraft are delayed while a ground controller attempts to contact a pilot or deliver a relatively simple clearance.

Studies made have shown that at least one-third of the communications between ground stations and aircraft consisted of position reports and communications relating to such reports. The present invention accommodates position reports automatically, and thus, the voice communication would be unnecessary. An additional one-third of the air traffic controls communication involve a limited group of messages of the type that lends itself to automatic transmission. These messages are:
 1. Initial Contacts
 2. Altitude Changes
 3. Heading Changes
 4. Speed Changes
 5. Frequency Changes
 6. Coded Instructions An analysis of the data to be transmitted by a controller to pilots in the six messages above discloses that most of them can be displayed with a small number of symbols. For example, (1) The Initial Contact need have no display and may be a discrete message which gives the aircraft's address and which would activate the display equipment of the selected aircraft so that it could accept subsequent messages for display.

2. Altitude data may be displayed in three digits.

3. Heading Changes may be displayed as a required magnetic heading that the aircraft is to take. An arrow may be displayed to indicate the desired direction of turn to make good the heading.

4. Speed may be displayed with three digits showing the desired indicated air speed in knots.

5. Frequency Changes may be displayed by five digits indicating the voice communications frequency.

6. Coded Instructions comprising standard brief instructions may be displayed with a relatively small number of digits.

The remaining one-third of the present air traffic control messages may be considerably longer and complex, such as holding instructions and reroute clearances or involving emergency procedures. Such use of voice communication may be continued. However, it is to be realized that since two-thirds of the voice communications has been removed with the system of this invention, that the controller will be under much less strain than at the present time.

Figure 13:
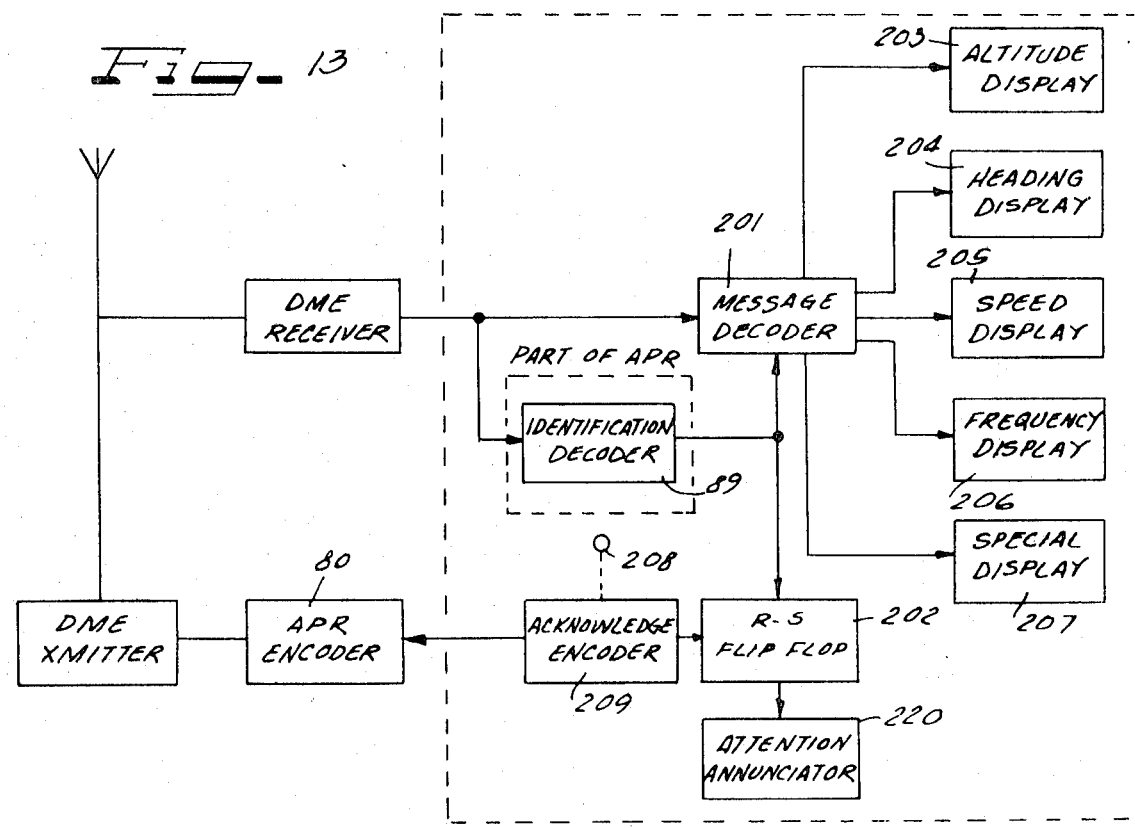
FIG. 13 is a block diagram of the airborne automatic identification reporting system.

FIG. 13 illustrates the airborne aircraft instruction reporting equipment. A message decoder 201 receives an output from the DME receiver and is energized to pass the message when the identity of the particular aircraft is recognized by the identification decoder 89. The identification decoder passes a signal to a flip-flop circuit 202 which receives an input from the message decoder 201 and supplies outputs to an altitude display 203, a heading display 204, a speed display 205, frequency display 206, and a special display 207. An acknowledge button 208 is connected to an acknowledge encoder 209 which supplies an output to the aircraft position report encoder 80 which sends back an acknowledge signal to the group station through the DME transmitter.

Figure 14:
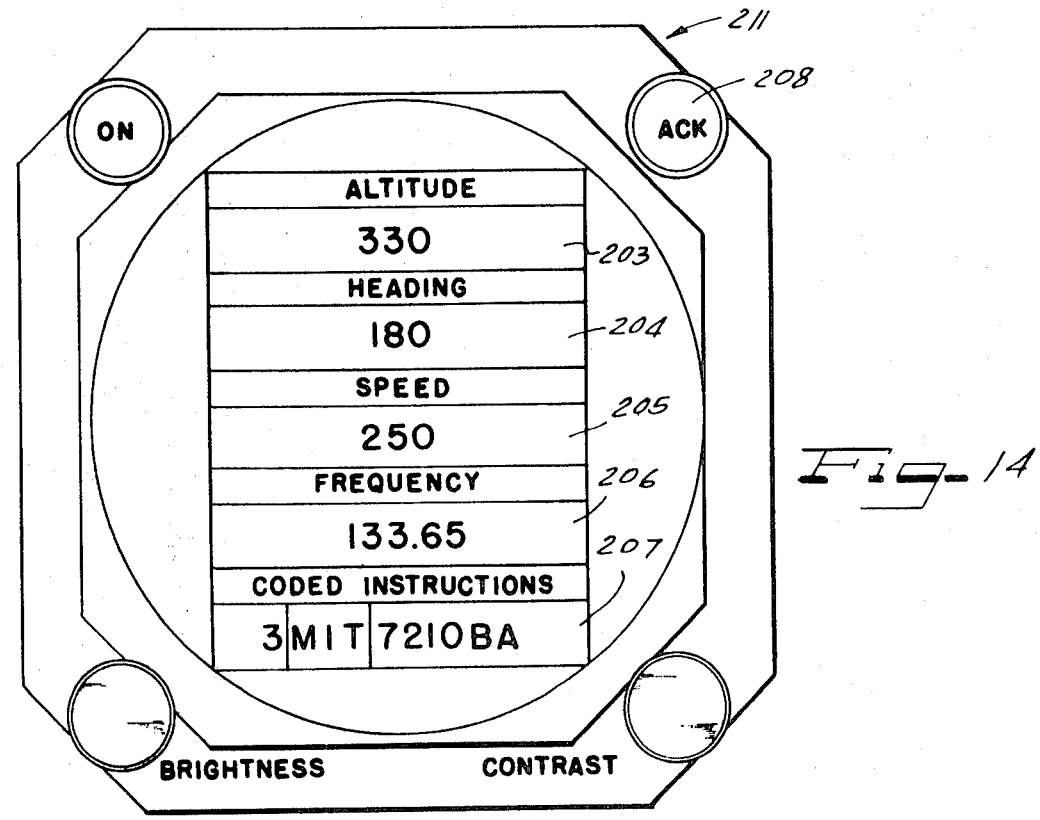
FIG. 14 is an airborne automatic reporting display.

The displays 203–207 may be mounted in a suitable display instrument 211 such as shown in FIG. 14. Thus, the pilot may automatically note the commanded altitude, heading, speed, frequency and special coded instruction, as shown in the various display units 203–207.

Figure 15:
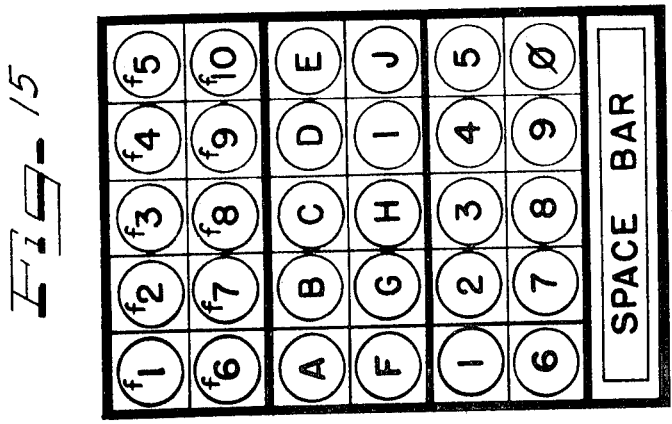
FIG. 15 is a controller input device.

The aircraft instrument reporting equipment at the ground station may include a numeric keyboard such as shown in FIG. 15 and may consist of a numeric keyboard 215 to permit insertion of the appropriate commands for aircraft identification, altitude, head, speed and frequency, and would include a number of function keys to give the special instructions to the pilot.

The ground station would also include a preview presentation very similar to the pilot's display, as shown in FIG. 14, onto which the information would be encoded by depressing the keys of the controller of FIG. 15. After the ground controller had monitored his desired commands to the aircraft and they had been presented on his ground monitor, which is similar to the airborne monitor of FIG. 14, a function key may be depressed to transmit the information which is on his ground monitor unit. The transmit button conveys the message through a high speed circuit to the DME station which the ATC computer determines that the aircraft is using. The message is encoded at the DME station and radiated to the aircraft when the particular aircraft is interrogated by the ground station. The message is stored until a particular aircraft is interrogated by the ground station. When the discrete identification of the aircraft is reached in the roll call, the instruction is transmitted to the addressed aircraft alone, and it will not be processed and displayed in any other aircraft because of the identification associated with the message.

The message will be received and identified by the aircraft and will be immediately presented on the display device 211 by erasing any previously displayed message. At the same time, an attention signal is operated. The attention annunciator is indicated by the numeral 220 in FIG. 13, for example. The pilot depresses the knowledge button 208 which turns off the attention annunciator 220 and transmits the message back to the ground station where it is compared with the signal on the preview area which is removed if the signal has been correctly transmitted to the aircraft.

The aircraft instruction reporting system will eliminate the need for length complicated instructions and clearances which now tie up the system.

Benefits to Aircraft Operators of the present invention are that:
 1. Proximity warning information is obtained.
 2. Has collision avoidance capability.
 3. It reduces delays due to current excess separation criteria.
 4. Reduction in operating costs due to resulting reduced separation criteria, and increased handling of aircraft.
 5. Operating costs are reduced due to sharply reduced delays in the terminal areas.

6. Reduction in navigational workload.
7. Eliminates the requirement for transmitting position reports.
8. Increased safety due to more effective surveillance coverage.
9. Greater flexibility in route selection.
10. Eliminates the handling of ATC instructions and clearances by voice communications.

Benefits of the invention to The Air Traffic Control System:
1. Delegation of separation responsibility to pilots.
2. Increased utilization of airspace.
3. Increased airport capacity.
4. Reduction in delays.
5. More complete coverage in area and low altitude.
6. More accurate position information.
7. Provides redundancy to present radar system.
8. Eliminates requirement of issuing ATC instructions and clearances by voice communications.

The utilization of both fixed wings and vertical and short-takeoff aircraft, and the implementation of information into the computer complex, allows the substantial increasing increase of traffic in the existing airspace.

Although various minor modifications might be suggested by those versed in the art, it should be understood that we wish to embody within the scope of the patent warranted herein all such modifications as reasonably and properly come within the scope of our contribution to the art.

We claim as our invention:
1. An aircraft navigation instrument comprising:
an aircraft indicia presented at the center of the instrument and controlled so as to indicate the aircraft's heading,
a vertical indicator on the instrument for indicating the aircraft's offset from a selected ground location,
a horizontal indicator on the instrument for indicating the aircraft's distance to or from said selected ground location,
indicia on the instrument for indicating the position of other aircraft, and
including a larger indicia which represents a selected one of said other aircraft.

* * * * *